(12) United States Patent
Ma et al.

(10) Patent No.: US 6,709,738 B2
(45) Date of Patent: Mar. 23, 2004

(54) COATED SUBSTRATE WITH ENERGY CURABLE CYANATE RESIN

(75) Inventors: Jingwen Ma, Woodbury, MN (US); Robert J. DeVoe, Oakdale, MN (US); Andrew M. Hine, St. Paul, MN (US); Ernest L. Thurber, Woodbury, MN (US); Don H. Kincaid, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 10 days.

(21) Appl. No.: 09/978,972

(22) Filed: Oct. 15, 2001

(65) Prior Publication Data

US 2003/0148106 A1 Aug. 7, 2003

(51) Int. Cl.[7] ................................................. B32B 5/16
(52) U.S. Cl. .................... 428/308.4; 428/102; 428/141; 428/147; 428/306.6; 428/423.1; 428/423.3; 428/500
(58) Field of Search .............................. 428/308.4, 102, 428/141, 147, 306.6, 423.1, 423.3, 500, 411.1, 704

(56) References Cited

U.S. PATENT DOCUMENTS

| | | | |
|---|---|---|---|
| 4,751,138 A | 6/1988 | Tumey et al. ............... | 428/323 |
| 4,985,340 A | 1/1991 | Palazzotto et al. .......... | 430/270 |
| 5,143,785 A | 9/1992 | Pujol et al. ................. | 428/352 |
| 5,215,860 A | 6/1993 | McCormick et al. ........ | 430/270 |
| 5,330,684 A | 7/1994 | Emori et al. ................ | 252/512 |
| 5,331,018 A | 7/1994 | McGinniss et al. .......... | 522/16 |
| 5,441,549 A | 8/1995 | Helmin ........................ | 51/298 |
| 5,454,750 A | 10/1995 | Cosmano et al. ........... | 451/526 |
| 5,494,981 A | 2/1996 | Gorodisher et al. ........ | 525/504 |
| 5,549,719 A | 8/1996 | Lee et al. .................... | 51/298 |
| 5,576,358 A | 11/1996 | Lem et al. ................... | 523/153 |
| 5,744,557 A | 4/1998 | McCormick et al. ....... | 526/171 |
| 5,766,277 A | 6/1998 | DeVoe et al. ................ | 51/295 |
| 5,912,377 A * | 6/1999 | Hall et al. ................... | 556/415 |
| 5,922,784 A | 7/1999 | DeVoe et al. ............... | 522/165 |
| 6,077,601 A | 6/2000 | DeVoe et al. ............... | 428/323 |
| 6,228,133 B1 * | 5/2001 | Thurber et al. .............. | 51/295 |

FOREIGN PATENT DOCUMENTS

| | | | | |
|---|---|---|---|---|
| EP | 0 945 477 A1 | 9/1999 | ............ | C08G/73/06 |
| WO | WO 99/56914 | 11/1999 | ............ | B24D/3/28 |
| WO | WO 00/37569 A1 * | 6/2000 | ............ | C09D/4/06 |

* cited by examiner

Primary Examiner—James J. Seidleck
Assistant Examiner—Melanie Bissett
(74) Attorney, Agent, or Firm—Jean A. Lown; Dean M. Harts

(57) ABSTRACT

Provided is a treated substrate comprising a backing material coated with a resin derived from a curable precursor resin, which comprises an energy-curable component comprising a cyanate ester resin and a curing agent. Also provided is an abrasive article comprising a plurality of abrasive particles incorporated into a bond system, wherein the bond system comprises a make resin derived from a first curable precursor resin, which comprises a first curable component comprising a cyanate ester resin and a first curing agent, and wherein the bond system additionally comprises a size resin derived from a second curable precursor resin, which comprises a second curable component comprising a cyanate ester resin and a second curing agent. Also provided are methods of making a treated substrate and an abrasive article.

31 Claims, 1 Drawing Sheet

COATED SUBSTRATE WITH ENERGY CURABLE CYANATE RESIN

FIELD OF THE INVENTION

This invention relates to coated substrates and coated abrasive articles that contain energy-curable cyanate ester resins and a method of making the coated substrate and the abrasive articles.

BACKGROUND

Cyanate ester resins have been used in a variety of composite, adhesive, and coating applications, such as conductive adhesives, structural adhesives, protective coatings, structural composites, abrasive binders, and semiconductor encapsulants.

U.S. Pat. No. 5,766,277 describes a coated abrasive article with a backing, a make coat on the backing, and a plurality of abrasive particles. The make coat precursor is an energy-curable melt-processable resin containing an epoxy resin, a polyester component, a polyfunctional acrylate component, and a curing agent for crosslinking the epoxy resin. A method of producing coated abrasive articles is also described.

U.S. Pat. No. 6,077,601 also describes a coated abrasive article. This article includes a backing, a first binder on the backing, and a plurality of abrasive particles in the first binder. The first binder precursor is an energy-curable preferably, melt-processable resin containing an epoxy resin, an ethylene-vinyl acetate copolymer, and a curing agent for crosslinking the epoxy resin (which is cured to provide a crosslinked make coating). The binder precursors are preferably free of homopolymers and copolymers of olefinic monomers. The first binder precursor may also contain a polyfunctional acrylate component.

SUMMARY OF THE INVENTION

Briefly, the present invention provides an abrasive article comprising a plurality of abrasive particles incorporated into a bond system for a variety of grinding applications. The bond system comprises a make resin derived from a first curable precursor resin, which comprises a first energy-curable component comprising a cyanate ester resin and a first curing agent. This bond system additionally comprises a size resin derived from a second curable precursor resin, which comprises a second energy-curable component comprising a cyanate ester resin and a second curing agent.

In another aspect, the present invention provides a method of making an abrasive article comprising the steps of (1) providing a substrate; (2) applying to the substrate a make coat layer comprising an energy-curable make coat precursor resin comprising a cyanate ester resin and a first curing agent; (3) applying a multiplicity of abrasive particles to the make coat layer; (4) curing the make coat precursor resin; (5) applying over the abrasive particles a size coat layer comprising an energy-curable size coat precursor resin comprising a cyanate ester resin and a second curing agent; and (6) curing the size coat precursor resin.

In another aspect, the present invention provides a treated substrate comprising a backing material coated with a resin derived from a curable precursor resin. The curable precursor resin comprises an energy-curable component comprising a cyanate ester resin and a curing agent. This resin is useful, for example, for presize, saturant, subsize, and backsize treatments of substrates.

As used herein:

"cyanate monomer" or "cyanate ester monomer" are used interchangeably and mean a chemical substance (generally a monomer, oligomer, or pre-polymer) in which at least one —OCN group is bonded to an organic radical R through the oxygen atom, forming at least one R—OCN bond; at least two —OCN groups are preferred because of commercial availability and their network forming property; and "energy curable" means curing by means of any of electromagnetic radiation (ultraviolet and visible), electron beam, and thermal (infrared and heat) means or any combination thereof such as heat and light simultaneously, or in any sequence, e.g., heat followed by light, light followed by heat followed by light, and the like.

It is an advantage of the present invention to provide abrasive articles for high temperature grinding applications. These articles have unique properties suitable for severe grinding conditions and can perform as well as traditional phenolic resin-based abrasive articles. In addition, the optional polyfunctional acrylate component serves as a rheological modifier to the composition, which allows for better control of the penetration of the cloth treatment into the backing and orientation of abrasive grits in the make resin.

It is another advantage of the present invention to provide a method of making abrasive articles for high temperature grinding applications that involves rapid curing and processing, which reduces the curing cycle time as well as allows better positioning of abrasive particles on a substrate.

Other advantages of the invention include the absence of volatile organic compounds and consistent products resulting from smooth coating.

The details of one or more embodiments of the invention are set forth in the accompanying drawing and the description below. Other features, objects, and advantages of the invention will be apparent from the description and from the claims.

DETAILED DESCRIPTION OF PREFERRED EMBODIMENTS

Figure 1:
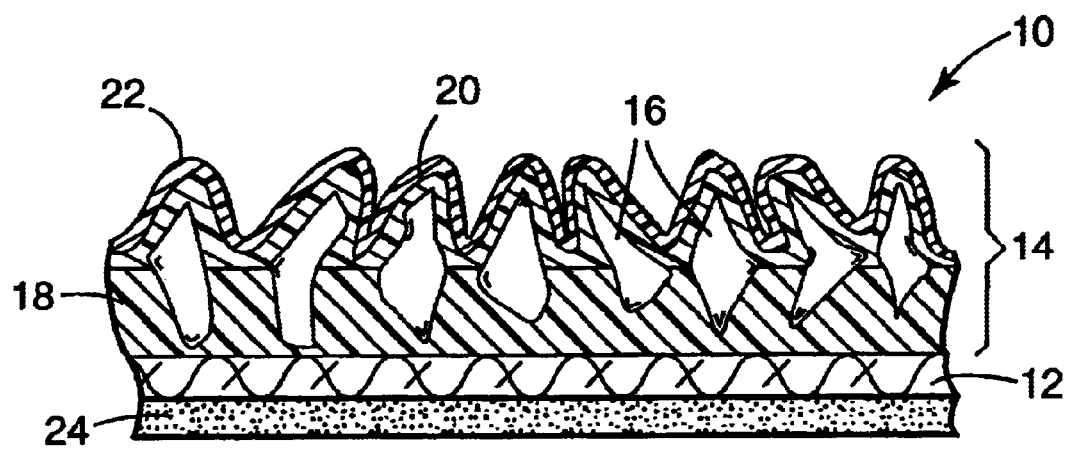
FIG. 1 is a side view of a portion of a coated abrasive article according to one embodiment of the invention.

The substrate treatments, make and size resins useful in the invention include, and more preferably consist essentially of, a cyanate ester resin, that contributes to the toughness, durability, and temperature resistance of the abrasive article, along with a curing agent for the cyanate ester of each resin. Optionally, the backing treatments, make and size resins can include an epoxy resin that may contribute to the toughness and durability of the make coat, a polyester component that allows for the make coat to display pressure sensitive adhesive properties, and/or a polyfunctional (meth)acrylate component to modify the rheology of the resin and reduce sensitivity to process variables, and an initiator for the polyfunctional acrylate portion of the formulation that permits the composition to cure upon exposure to energy.

Turning now to the drawing, FIG. 1 illustrates a coated abrasive article 10 according an embodiment of the invention comprising a substrate 12 and an abrasive layer 14 bonded thereto.

Substrate 12 may be a conventional, sealed coated abrasive substrate or a porous, non-sealed substrate. Substrate 12 is preferably flexible. For example, substrate 12 can be any of the cloth, paper, nonwoven materials, polymeric films, metal foils, mesh, foam backings, and multilayer combinations thereof, or other backings typically used for abrasive articles. Examples of nonwoven substrates include scrims and laminates to different substrate materials mentioned herein. Such nonwovens may be formed of cellulosic fibers, synthetic fibers or blends thereof. Examples of polymeric backings include polyolefin and polyester films. Such polymeric substrates can be provided as blown film, or as laminates of different types of polymeric materials, or laminates of polymeric films with a non-polymeric type of backing material. Examples of foam substrates include natural sponge material, polyurethane foam, and the like. Such foam substrate also can be laminated to a different type of backing material. Examples of mesh substrates include polymeric or metal open-weave scrims.

When a porous substrate is selected, the make coat may infiltrate into the interstices of the porous substrate. When the infiltration is not limited, it may reduce the effective coating thickness of the make coat and can make it difficult to bond the subsequently applied abrasive particles to the substrate. Upon curing, this can result in a undesirably stiff or even brittle substrate. With the present invention, any one or more of several options can limit the undesirable infiltration. For example, infiltration can be limited by the selection of a make coat having a higher viscosity, by employing one or more backing treatments of this invention, such as presize, saturant, subsize, backsize, or the like, to limit the porosity of the substrate, and/or by selecting process conditions to cure the make coat before the level of infiltration becomes undesirable. In some of these options, the make coat effectively functions as a presize, saturant, or subsize without adding a process step. That is, a single layer of make resin can function as both the make resin and a backing or substrate treatment. Other coatings of presize, saturant, subsize, backsize, sealant, or the like, also are useful in the present invention.

The presize coat, saturant coat, backsize coat, and subsize coat generally include thermally curable resinous adhesives, including, for example, phenolic resins, epoxy-functional materials, (meth)acrylate resins, latices (e.g., acrylic latices), urethane resins, glue, and starch. A saturant saturates the porous backing and fills pores, resulting in a less porous, stiffer backing with more body. An increase in body provides an increase in strength and durability of the article. A presize coat, which is applied to the front side of the backing, i.e., the side to which the abrasive layer is applied, may add bulk to the backing and/or may improve adhesion of subsequent coatings. A backsize coat, which is applied to the back side of the backing, i.e., the side opposite that to which the abrasive layer is applied, may add body to the backing and protect the backing from wear. A subsize coat is similar to a saturant coat except that it is applied to a backing that already has saturant coat thereon to fill or smooth out the coating.

Abrasive layer 14 comprises a multiplicity of abrasive particles 16 which are bonded to a major surface of substrate 12 by make coat 18. Size coat 20 is applied over the abrasive particles and the make coat. The abrasive particles typically have a particle size of about 0.1 to 5000 μm, more preferably from about 10 to 1200 μm. Preferred abrasive particles include those described in the art as coarse grade abrasives for rough cutting and/or severe grinding applications, during which high temperatures are generated. Other useful abrasives typically have an average particle size of at least about 0.1 μm and more preferably at least about 10 μm. The abrasive grits preferably have an average particle size of up to about 5000 μm, more preferably up to about 1500 μm, and most preferably up to about 1200 μm. Examples of useful abrasive particles include fused aluminum oxide based materials such as aluminum oxide, ceramic aluminum oxide, heat-treated aluminum oxide, silicon carbide, fused alumina-zirconia, ceria, titanium diboride, cubic boron nitride, boron carbide, tungsten carbide, titanium carbide, natural and synthetic diamond, garnet, abrasive agglomerates, and combinations thereof.

A bond system on substrate 12 supports a coating of abrasive particles 16. Abrasive particles 16 are secured to the substrate by make coat 18, sometimes referred to as a first binder. Additionally, abrasive particles 16 are preferentially oriented with their longest dimension perpendicular to the substrate to provide an optimum cut rate.

Make coat 18 is derived from a first curable precursor resin, which comprises a first radiation curable component comprising a cyanate ester resin and a first curing agent. The make coat may be in a solid form prior to coating and can be coated as a hot melt. Alternatively, the make coat may be a solid film that is transfer coated to the backing. It may be desirable to add solvent to solubilize components and aid in processing. Solutions of the curable precursor resin in solvent, preferably organic solvent, can be used in an amount up to 99 weight percent (wt %) solvent, but preferably in the range of 0 to 90 wt %, most preferably in the range of 0 to 75 wt % solvent. Most preferably, the curable precursor resin is solvent-free.

The first curable precursor resin may also include another resin or combination of resins such as an epoxy resin, a polyester resin, and/or an acrylate resin with a photoinitiator.

Suitable cyanate ester resins comprise cyanate ester compounds (monomers and oligomers) each having one or more —OCN functional groups, and typically having a cyanate equivalent weight of from about 60 to about 500, preferably from about 75 to about 250. The molecular weight of the monomers and oligomers typically ranges from about 150 to about 2000. If the molecular weight is too low, the cyanate ester may have a crystalline structure that is difficult to dissolve. If the molecular weight is too high, the compatibility of the cyanate ester with other resins may be poor.

Preferred compositions of the invention include one or more cyanate esters according to formulas I, II, III or IV. Formula I is represented by $$Q(OCN)p \qquad\qquad I$$

wherein p is an integer from 1 to 7, preferably from 2 to 7, and wherein Q comprises a mono-, di-, tri-, or tetravalent aromatic hydrocarbon containing from 5 to 30 carbon atoms and zero to 5 aliphatic, cyclic aliphatic, or polycyclic aliphatic, mono- or divalent hydrocarbon linking groups containing 7 to 20 carbon atoms. Optionally, Q may comprise 1 to 10 heteroatoms selected from the group consisting of non-peroxidic oxygen, sulfur, non-phosphino phosphorus, non-amino nitrogen, halogen, and silicon.

Formula II is represented by

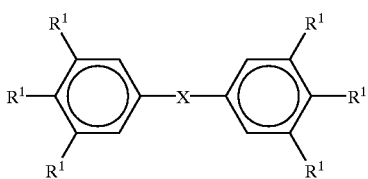

wherein X is a single bond, a lower alkylene group having from 1 to 4 carbons, S, or $SO_2$; and where each $R^1$ is independently hydrogen, an alkyl group having from one to three carbon atoms, or a cyanate group (—OCN), with the proviso that at least one $R^1$ group is a cyanate group. In preferred compounds, each of the $R^1$ groups is H, methyl, or a cyanate group, with at least two $R^1$ groups being cyanate groups.

Formula III is represented by

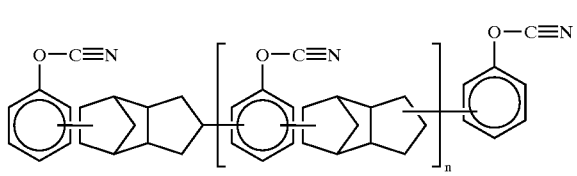

wherein n is a number from 0 to about 5.

Formula IV is represented by

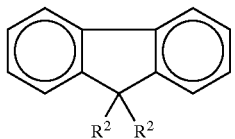

wherein each $R^2$ independently is

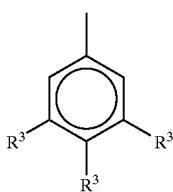

wherein each $R^3$ is independently H, a lower alkyl group having from about 1 to about 5 carbon atoms, or a cyanate ester group, and preferably is a hydrogen, methyl or a cyanate ester group, with the proviso that the $R^3$ s together comprise at least one cyanate ester group.

Useful cyanate ester compounds include, but are not limited to the following:

1,3- and 1,4-dicyanatobenzene; 2-tert-butyl-1,4-dicyanatobenzene;
2,4-dimethyl-1,3-dicyanatobenzene; 2,5-di-tert-butyl-1,4-dicyanatobenzene;
tetramethyl-1,4-dicyanatobenzene; 4-chloro-1,3-dicyanatobenzene;
1,3,5-tricyanatobenzene; 2,2'- and 4,4'-dicyanatobiphenyl; 3,3',5,5'-tetramethyl-4,4'-dicyanatobiphenyl;
1,3-, 1,4-, 1,5-, 1,6-, 1,8-, 2,6-, and 2,7-dicyanatonaphthalene;
1,3,6-tricyanatonaphthalene; bis(4-cyanatophenyl)methane; bis(3-chloro-4-cyanatophenyl)methane; bis(3,5-dimethyl-4-cyanatophenyl)methane;
1,1-bis(4-cyanatophenyl)ethane; 2,2-bis(4-cyanatophenyl)propane;
2,2-bis(3,3-dibromo-4-cyanatophenyl)propane;
2,2-bis(4-cyanatophenyl)-1,1,1,3,3,3-hexafluoropropane;
bis(4-cyanatophenyl)ester; bis(4-cyanatophenoxy)benzene;
bis(4-cyanatophenyl)ketone; bis(4-cyanatophenyl)thioether;
bis(4-cyanatophenyl)sulfone; tris(4-cyanatophenyl) phosphate, and
tris(4-cyanatophenyl)phosphate.

Also useful are cyanic acid esters derived from phenolic resins, e.g., as disclosed in U.S. Pat. No. 3,962,184, cyanated novolac resins derived from novolac, e.g., as disclosed in U.S. Pat. No. 4,022,755, cyanated bis-phenol-type polycarbonate oligomers derived from bisphenol-type polycarbonate oligomers, as disclosed in U.S. Pat. No. 4,026,913, cyano-terminated polyarylene ethers as disclosed in U.S. Pat. No. 3,595,900, and dicyanate esters free of ortho hydrogen atoms as disclosed in U.S. Pat. No. 4,740,584, mixtures of di- and tricyanates as disclosed in U.S. Pat. No. 4,709,008, polyaromatic cyanates containing polycyclic aliphatic groups as disclosed in U.S. Pat. No. 4,528,366, e.g., Quartex™ 7187, available from Dow Chemical, fluorocarbon cyanates as disclosed in U.S. Pat. No. 3,733,349, and cyanates disclosed in U.S. Pat. Nos. 4,195,132, and 4,116, 946, all of the foregoing patents being incorporated herein by reference for teachings related to cyanates.

Polycyanate compounds obtained by reacting a phenol-formaldehyde precondensate with a halogenated cyanide are also useful.

Examples of preferred cyanate ester resin compositions include low molecular weight ($M_n$) oligomers, e.g., from about 250 to about 5000, e.g., bisphenol-A dicyanates such as AroCy™ "B-30 Cyanate Ester Semisolid Resin"; low molecular weight oligomers of tetra o-methyl bis-phenol F dicyanates, such as "AroCy™ M-30 Cyanate Ester Semisolid Resin"; low molecular weight oligomers of thiodiphenol dicyanates, such as AroCy™ "T-30", all of which are commercially available from Vantico, Inc., Brewster, N.Y.

A particular aromatic cyanate ester resin useful in the present invention has the formula:

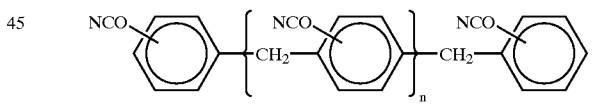

wherein n is selected to provide the resin a modulus ranging from soft to brittle, and resins of more than one n may be used in combination. Such materials are available as PT15, PT30, PT60, and CT90 from Lonza Group Ltd., Basel, Switzerland. These cyanate esters have different molecular weights and varying degrees of functionality, with PT15 having the lowest molecular weight (PT60 having the highest) and with CT90 having a higher degree of functionality than the PT series.

The cyanate ester resin(s) comprise from about 40 to about 99 weight percent (wt %) of the make resin, more preferably from about 50 to about 99 wt %, most preferably from about 60 to about 99 wt %.

Suitable epoxy resins include organic compounds having at least one oxirane ring polymerizable by a ring opening reaction. Such materials, broadly called epoxides, include both monomeric and polymeric epoxides and can be aliphatic, cycloaliphatic, or aromatic. They can be liquid or solid or blends thereof, blends being useful in providing tacky adhesive films. These materials generally have, on the average, at least two epoxy groups per molecule (preferably more than two epoxy groups per molecule). The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The molecular weight of the epoxy resin may vary from about 74 to about 100,000 or more. Mixtures of various epoxy resins can also be used in the hot melt compositions of the invention. The "average" number of epoxy groups per molecule is defined as the number of epoxy groups in the epoxy resin divided by the total number of epoxy molecules present.

Cycloaliphatic epoxy resins useful in the invention preferably are selected from 3,4-epoxycyclohexylmethyl-3,4-epoxycyclohexane carboxylate (ERL-4221), 2-(3,4-epoxy)cyclohexylmethyl-5,5'-spiro(3,4-epoxy)cyclohexane-m-dioxane (ERL-4234), and bis((4-methyl-7-oxabicyclo (4.1.0)hept-3-yl)methyl)adipate (ERL-4299), all of which are available from Dow Chemical Co., Midland, Mich. (hereinafter Dow). For a more detailed list of useful epoxides of this nature, reference may be made to U.S. Pat. No. 3,117,099, incorporated herein by reference.

Other commercially available cycloaliphatic epoxies that are useful in the present invention include vinyl cyclohexene monoxide (Dow), cyclohexene oxide (Aldrich Chemical Co., Milwaukee, Wis.), vinyl cyclohexene dioxide (ERL 4206™, Dow), and limonene oxide, limonene dioxide, and α-pinene oxide (these three being available from Elf Atochem, Philadelphia, Pa.). Also useful are cycloaliphatic mono- and di-epoxy oligo-siloxanes, which include α,ω-di-(3,4-cyclohexene-2-ethyl)siloxanes, such as α,ω-di-(3,4-cyclohexene-2-ethyl)-tetramethyl disiloxane, α,ω-di(3,4-cyclohexane-2-ethyl)-hexamethyl trisiloxane, as well as α-3,4-cyclohexene-2-ethyl siloxanes, such as α-3,4-cyclohexene-2-ethyl pentamethyl disiloxane. These epoxies can be prepared according to the method of Crivello et al., J. Poly. Sci., A: Poly. Chem. Vol. 28, pages 479–503 (1990).

A variety of other commercially available epoxy resins also can be used in this invention. In particular, readily available epoxides include octadecylene oxide, epichlorohydrin, styrene oxide, glycidol, glycidyl-methacrylate, diglycidyl ether of Bisphenol A (e.g., those available as "EPON 828", "EPON 1004", and "EPON 1001F", from Resolution Performance Products, Houston, Tex., and "DER-332" and "DER-334", from Dow), diglycidyl ether of Bisphenol F (e.g., "ARALDITE GY281" from Vantico), vinylcyclohexene dioxide (e.g., "ERL 4206" from Dow), dipentene dioxide (e.g., "ERL4269" from Dow), epoxidized polybutadiene (e.g., "OXIRON 2001" from FMC Corp.), silicone resin containing epoxy functionality, epoxy silanes, e.g., beta-3,4-epoxycyclohexylethyltrimethoxy silane and gamma-glycidoxypropyltrimethoxy silane, commercially available from Dow, flame retardant epoxy resins (e.g., "DER-542," a brominated bisphenol type epoxy resin available from Dow), 1,4-butanediol diglycidyl ether (e.g., "ARALDITE RD-2" from Vantico), hydrogenated bisphenol A-epichlorohydrin based epoxy resins (e.g., "EPONEX 1510" from Resolution Performance Products), and polyglycidyl ether of phenol-formaldehyde novolak (e.g., "DEN-431" and "DEN-438" from Dow).

The epoxy resin(s) comprise from about 0 to about 50 wt % of the make resin, more preferably from about 10 to about 50 wt %, most preferably from about 20 to about 40 wt %.

Suitable polyester resins include both hydroxyl- and carboxyl-terminated materials, which may be amorphous or semicrystalline, of which the hydroxyl-terminated materials are more preferred. As used herein, "amorphous" means a material that displays a glass transition temperature but does not display a measurable crystalline melting point by differential scanning calorimetry (DSC). As used herein, "semicrystalline" means a polyester component that displays a crystalline melting point by DSC, preferably with a maximum melting point of about 150° C.

The viscosity of the polyester component is important in providing a hot melt make coat (as opposed to a make coat which is a liquid having a measurable viscosity at room temperature). Accordingly, polyester components useful in the make coats of the invention preferably have a Brookfield viscosity which exceeds 10,000 millipascals at 121° C. as measured on a Brookfield Viscometer Model #DV-II employing spindle #27 with a thermocel attachment. Viscosity is related to the molecular weight of the polyester component. Preferred polyester components also have a number average molecular weight of about 7500 to 200,000, more preferably from about 10,000 to 50,000 and most preferably from about 20,000 to 40,000.

Polyester components useful in the make coats of the invention comprise the reaction product of dicarboxylic acids (or their diester derivatives) and diols. The diacids (or their diester derivatives) can be saturated aliphatic acids containing from 4 to 12 carbon atoms (including unbranched, branched, or cyclic materials having 5 to 6 atoms in a ring) and/or aromatic acids containing from 8 to 15 carbon atoms. Examples of suitable aliphatic acids are succinic, glutaric, adipic, pimelic, suberic, azelaic, sebacic, 1,12 dodecanedioic, 1,4-cyclo-hexanedicarboxylic, 1,3-cyclopentane-dicarboxylic, 2-methylsuccinic, 2-methylpentanedioic, 3-methylhexanedioic acids and the like. Suitable aromatic acids include terephthalic acid, isophthalic acid, phthalic acid, 4,4'-benzophenone dicarboxylic acid, 4,4'-diphenylmethanedicarboxylic acid, 4,4'-diphenylether dicarboxylic acid, 4,4'-diphenylthio-ether dicarboxylic acid and 4,4'-diphenylamine dicarboxylic acid. Preferably the structure between the two carboxyl groups in these diacids contains only carbon and hydrogen; more preferably it is a phenylene group. Blends of any of the foregoing diacids may be used.

The diols include branched, unbranched, and cyclic aliphatic diols having from 2 to 12 carbon atoms, such as, for example, ethylene glycol, 1,3-propylene glycol, 1,2-propylene glycol, 1,4-butanediol, 1,3-butanediol, 1,5-pentanediol, 2-methyl-2,4-pentanediol, 1,6-hexanediol, 1,8-octanediol, cyclobutane-1,3-di(2'-ethanol), cyxlohexane-1,4-dimethanol, 1,10-decanediol, 1,12-dodecanediol, and neopentyl glycol. Long chain diols including poly (oxyalkylene)glycols in which the alkylene group contains from 2 to 9 carbon atoms (preferably 2 to 4 carbon atoms) may also be used. Blends of any of the foregoing diols may be used.

Useful, commercially available hydroxyl-terminated polyester materials include various saturated, linear, semi-crystalline copolyesters available from Creanova, Inc., Piscataway, N.J. under the trade designations including "DYNAPOL S1402", "DYNAPOL S1358", "DYNAPOL S1227", "DYNAPOL S1229" and "DYNAPOL S1401". Useful saturated, linear amorphous copolyesters available from Creanova, Inc., include materials under the trade designations "DYNAPOL S1313" and "DYNAPOL S1430".

The polyester resin(s) comprise from about 0 to about 50 wt % of the make resin, more preferably from about 2 to about 40 wt %, most preferably from about 2.5 to about 30 wt %.

Suitable acrylate resins include "polyfunctional acrylate" materials, which means ester compounds that are the reaction product of aliphatic polyhydroxy compounds and (meth)acrylic acids. The aliphatic polyhydroxy compounds include compounds such as (poly)alkylene glycols and (poly)glycerols. (Meth)acrylic acids are unsaturated carboxylic acids which include, for example, those represented by the basic formula: $H_2C—C(R)=COOH$, where R is a hydrogen atom or a methyl group. Polyfunctional acrylates can be a monomer or an oligomer. For purposes of this invention, the term "monomer" means a small (low-molecular-weight) molecule with an inherent capability of forming chemical bonds with the same or other monomers in such manner that long chains (polymeric chains or macromolecules) are formed. Also, the term "oligomer" means a polymer molecule having 2 to 10 repeating units (e.g., dimer, trimer, tetramer, and so forth) having an inherent capability of forming chemical bonds with the same or other oligomers in such manner that longer polymeric chains can be formed therefrom. Mixtures of monomers and oligomers also could be used as the polyfunctional acrylate component. The polyfunctional acrylate, when used, is preferably monomeric.

Representative polyfunctional acrylate monomers include, by way of example and not limitation: ethylene glycol diacrylate, ethylene glycol dimethacrylate, hexanediol diacrylate, triethylene glycol diacrylate, trimethylolpropane triacrylate, ethoxylated trimethylolpropane triacrylate, glycerol triacrylate, pentaerthyitol triacrylate, pentaerythritol trimethacrylate, pentaerythritol tetraacrylate, pentaerythritol tetramethacrylate, and neopentylglycol diacrylate. Mixtures and combinations of different types of such polyfunctional acrylates also can be used. The term "acrylate", as used herein, encompasses acrylates and methacrylates.

Useful commercially available polyfunctional acrylates include a trimethylolpropane triacrylate having the trade designation "SR351", an ethoxylated trimethylolpropane triacrylate having the trade designation "SR454", a pentaerythritol tetraacrylate having the trade designation "SR295", and a neopentylglycol diacrylate having the trade designation "SR247", and all of these being commercially available from Sartomer Co., Exton, Pa.

The polyfunctional acrylate monomers cure quickly into a network due to the multiple functionalities available on each monomer. If there is only one acrylate functionality, a linear, non-networked molecule will result upon cure of the material. Polyfunctional acrylates having a functionality of two or more are preferred in this invention to encourage and promote the desired polymeric network formation.

Useful polyfunctional acrylate oligomers include commercially available polyether oligomers such as polyethylene glycol 200 diacrylate ("SR259" commercially available from Sartomer Co., Exton, Pa.) and polyethylene glycol 400 diacrylate ("SR344" also from Sartomer).

Other oligomers include acrylated epoxies such as diacrylated esters of epoxy resins, e.g., diacrylated esters of bisphenol A epoxy resin. Examples of commercially available acrylated epoxies include epoxies available as Ebecryl™ 3500, 3600, 3700, and 3720 from UCB Specialty Chemicals, Smyrna, Ga.

In the case of the free radical curable polyfunctional acrylate component, it is useful to add a free radical initiator to the make resin precursor, although it should be understood that an electron beam source also could be used to initiate and generate free radicals. The free radical initiator preferably is added in an amount of 0.1 to 3 wt %, based on the total amount of resinous components. Examples of useful photoinitiators, that generate a free radical source when exposed to ultraviolet light, include, but are not limited to, organic peroxides, azo compounds, quinones, benzophenones, nitroso compounds, acyl halides, hydrazones, mercapto compounds, pyrylium compounds, triacylimidazoles, acylphosphine oxides, bisimidazoles, chloroalkyltriazines, benzoin ethers, benzil ketals, thioxanthones, and acetophenone derivatives, and mixtures thereof. Examples of photoinitiators that generate a source of free radicals when exposed to visible radiation, are described in U.S. Pat. No. 4,735,632, which description is herein incorporated by reference. A preferred free radical-generating initiator for use with ultraviolet light is an initiator commercially available from Ciba Geigy Corporation under the trade designation "IRGACURE 651".

In general, the optimal amount of the polyfunctional acrylate used in the make resin are proportional to the acrylate equivalent weight and inversely proportional to the acrylate functionality. More specifically, the acrylate resin(s) comprise from about 0 to about 30 wt. % of the make resin, more preferably from about 0.05 to about 20 wt %, most preferably from about 0.10 to about 10 wt %.

Make resins that include polyfunctional acrylates are higher in viscosity after exposure to UV radiation. This feature allows for a fine-tuning of the relative rates of cyanate cure and resin flow allowing for control of the degree of abrasive particle wetting and orientation. Generally, too little polyfunctional acrylate allows the resin to flow readily, wetting the abrasive particles so well that the abrasive particles are buried below the surface of the coating, particularly with thicker coatings. With too much polyfunctional acrylate, the resin cannot flow sufficiently to wet the abrasive particles before the cyanate ester component is fully cured. In this case, even though the uncured make coat resin is aggressively tacky at room temperature, abrasive particle adhesion and the mineral weight can be low because the irradiated resin gels too fast and loses tack. The useful acrylate range is determined by testing the mineral weight and mineral adhesion to the backing, such as by hand rubbing after a one-hour cure. Through this method, the preferred level of TMPTA (trimethylolpropane triacrylate) to enhance the mineral orientation was in the range of 2 to 6 wt %.

In one embodiment, the make resin comprises a first curable precursor resin that includes at least 50 wt % cyanate ester resin and further includes from about 2.5 to about 30 wt % polyester resin and from about 0 to about 50 wt % epoxy resin.

Suitable curing agents promote polymerization of the make resin. The curing agent is activated by radiation, which may be heat or light. A photocatalyst curing agent is preferably activated by actinic radiation.

The curing agent for the make resin is included in an amount sufficient to cure the resin under the desired process conditions including line speed and temperature. The curing agent preferably is included in an amount ranging from about 0.01 to 10 wt % (more preferably 0.1 to 3 wt %) based on the combined weight of the other resin components. Increasing amounts of the catalyst accelerates the curing rate but may require that the make resin be applied in a thinner layer to avoid curing only at the surface. Increased amounts of catalyst can also result in reduced energy exposure requirements and a shortened pot life at application temperatures. The amount of the catalyst is determined by the desired rate at which the resin should cure, the intensity of the energy source, and the thickness of the resin.

The curing agent for the make resin promotes crosslinking of the radiation curable precursor resin. The curatives may be activated by exposure to electromagnetic radiation (e.g., light having a wavelength in the ultraviolet or visible regions of the electromagnetic spectrum), by accelerated particles (e.g., electron beam radiation), or thermally (e.g., heat or infrared radiation). Preferably, the curatives are photoactive; that is, they are photocuratives activated by actinic radiation.

The make resin can polymerize via a free radical mechanism while the epoxy portion of the formulation can polymerize via a cationic mechanism. In most instances, when a photocurative is exposed to ultraviolet or visible light, it generates a free radical or a cation, depending on the type of photocurative. Then, the free radical initiates or cation catalyzes the polymerization of the resins.

A curing agent included in the make coat formulation to promote polymerization of the cyanate and epoxy resins of the make coat preferably also is photoactive; that is, the curing agent is preferably a photocatalyst activated by actinic radiation. Useful cationic photocatalysts generate an acid to catalyze the polymerization of these resins. It should be understood that the term "acid" can include either protic or Lewis acids. These cationic photocatalysts can include a metallocene salt having an onium cation and a halogen containing complex anion of a metal or metalloid. Other useful cationic photocatalysts include a metallocene salt having an organometallic complex cation and a halogen containing complex anion of a metal or metalloid which are further described in U.S. Pat. No. 4,751,138 (e.g., column 6, line 65 to column 9, line 45), which is herein incorporated by reference. Another example is an organometallic salt and an onium salt described in U.S. Pat. No. 4,985,340 (col. 4, line 65 to col. 14, line 50); EP 306 161; and EP 306 162, all herein incorporated by reference. Still other cationic photocatalysts include an ionic salt of an organometallic complex in which the metal is selected from the elements of Periodic Group IVB, VB, VIB, VIIB and VIIIB as described in EP 109 581, which is also herein incorporated by reference.

The cationic catalyst, as a curing agent for the cyanate and epoxy resins, preferably is included in an amount ranging from about 0.1 to 3% based on the combined weight of all of the resinous components, e.g., cyanate, epoxy, acrylate, etc. Increasing amounts of the catalyst results in an accelerated curing rate but requires that the make coat be applied in a thinner layer so as to avoid curing only at the surface. Increased amounts of catalyst can also result in reduced energy exposure requirements and a shortened pot life at application temperatures. The amount of the catalyst is determined by the desired rate at which the make coat should cure, the intensity of the energy source, and the thickness of the make coat. The same guidelines apply to selection of the amount of the initiator added for curing the polyfunctional acrylate component.

Although the preferred curing agent for the cyanate ester and epoxy resins is a cationic photocatalyst, certain latent curatives may be utilized, such as the well-known latent curative dicyandiamide.

Where the catalytic photoinitiator used for curing the resins is a metallocene salt catalyst, it optionally is accompanied by an accelerator such as an oxalate ester of a tertiary alcohol as described in U.S. Pat. No. 5,436,063. Oxalate co-catalysts that can be used include those described in U.S. Pat. No. 5,252,694. The accelerator preferably comprises from about 0.1 to 4% of the make coat based on the combined weight of the resinous components.

Particular examples of curing agent materials useful in the present invention include COM ((cyclopentadienyl)(m-xylene)iron(+1)hexafluoroantimonate(−1)) and MMT (methylcyclopentadienyl manganese tricarbonyl).

Size coat 20, sometimes referred to as a second binder, is applied over make coat 18 and abrasive particles 16. The size coat is derived from a second curable precursor resin, which comprises a second radiation curable component comprising a cyanate ester resin and a second curing agent. The second curable precursor resin may also include another resin or combination of resins such as an epoxy resin.

Suitable resins include the entire array describe above as useful in the first curable precursor resin present in the make resin.

The size resin comprises 50 to 100 wt %, more preferably 70 to 100 wt %, of a cyanate ester resin, and optionally up to 50 wt %, more preferably up to 30 wt %, of an epoxy resin.

The first and/or second curable precursor resin can be coated via first dissolving the selected resin composition in solvent or via any of several low- or no-solvent coating methods, as described below.

It may be desirable, and in some embodiments it is preferred, that the substrate treatment, make resin, and/or size resin layers may additionally comprise various optional additives such as fillers, grinding aids, fibers, lubricants, anti-loading agents, wetting agents, surfactants, pigments, antifoaming agents, dyes, coupling agents, plasticizers, suspending agents, etc. These can be added in an amount effective for their intended purpose.

Fillers useful with this invention include silica such as quartz, glass beads, glass bubbles and glass fibers; silicates such as talc, clays, feldspar, mica, calcium silicate, calcium metasilicate, sodium aluminosilicate, sodium silicate; metal carbonates and sulfates such as calcium sulfate, calcium carbonate, barium sulfate, sodium sulfate, aluminum sodium sulfate, aluminum sulfate; gypsum; vermiculite; wood flour; aluminum trihydrate; carbon black; aluminum oxide; titanium dioxide; cryolite; chiolite; and metal sulfites such as calcium sulfite. Preferred fillers include cryolite, feldspar, and calcium carbonate. These can be added in an amount effective for their intended purpose. In the make resin, the amount of filler is preferably from about 15 to 60 wt % of the combined blend of cyanate resin, curing agent, and other optional components, more preferably from about 25 to 50 wt %. In the size resin, the amount of filler can be higher, preferably from about 15 to 75 wt %, more preferably from about 40 to 70 wt %.

Abrasive layer 14 may further comprise another resin or supersize coating 22. Supersize coating 22 may be included to prevent or reduce the accumulation of swarf (the material abraded from a workpiece) between abrasive particles, which can dramatically reduce the cutting ability of the abrasive article. Materials useful in preventing swarf accumulation include metal salts of fatty acids (e.g., zinc stearate or calcium stearate), salts of phosphate esters (e.g., potassium behenyl phosphate), phosphate esters, urea-formaldehyde resins, waxes, mineral oils, crosslinked silanes, crosslinked silicones, fluorochemicals, and combinations thereof. Supersize coating 22 may include a grinding aids as described in the abrasive art, for example in U.S. Pat. Nos. 5,441,549, and 5,454,750, the disclosures of which are herein incorporated by reference.

An optional back size coating 24, such as an antislip layer, comprising a resinous adhesive having filler particles dispersed therein can be provided. Alternatively, the backsize coating may be a pressure sensitive adhesive for bonding the coated abrasive article to a support pad and may be provided on backing 12. Examples of suitable pressure sensitive adhesives include latex, crepe, rosin, acrylate polymers (e.g., polybutyl acrylate and polyacrylate esters), acrylate copolymers (e.g., isooctylacrylate-acrylic acid), vinyl ethers (e.g., polyvinyl n-butyl ether), alkyd adhesives, rubber adhesives (e.g., natural rubbers, synthetic rubbers and chlorinated rubbers), and mixtures thereof.

The resins described above in reference to make and/or size resin are additionally useful as backing or substrate treatments, for example, as presize, saturant, subsize, and/or backsize treatments.

The treated substrates of the present invention are made by first providing a substrate as described above, and applying to the substrate a resin layer as described above. This resin may be applied to one or both sides of the substrate.

The articles of the present invention are made by first providing a substrate as described above, and applying to the substrate a make coat layer comprising an energy-curable make coat precursor resin comprising a cyanate ester resin and a first curing agent. Then, a multiplicity of abrasive particles are applied to the make coat layer, and the make coat precursor resin is cured. A size coat layer comprising an energy-curable size coat precursor resin comprising a cyanate ester resin and a second curing agent is applied over the abrasive particles. Then the size coat precursor resin is cured.

The steps of applying the make coat layer and applying the size coat layer involve a known process selected from melt-processing, knife coating, spray coating, powder coating, and roll coating. A "melt processable" composition refers to a composition that can transform, e.g., by application of heat and/or pressure, from a solid to a viscous liquid by melting, at which point it can be readily applied to a coated abrasive article substrate. This is sometimes called "hot melt" coating. "Hot melt" coating refers to a composition that is a solid at room temperature (about 20 to 25° C.) but which melts to a viscous liquid that can be readily applied to a coated abrasive article substrate. Desirably, the melt-processable resins, hot melt resins, or powder-coated resins of the invention can be formulated as solvent free systems (i.e., they have less than 1% solvent in the solid state). However if so desired, it may be feasible to incorporate solvent or other volatiles into the make resin or resin precursor(s). Solvents may be preferred in other coating methods. Further detail can be found in U.S. Pat. No. 5,766,277 (especially col. 10. line 46–col. 19, line 19), which is herein incorporated by reference.

The curing steps can be achieved by using any source of radiation including electron beam radiation and radiation sources emitting active radiation in the ultraviolet and visible region of the spectrum (e.g., about 200 to 800 nm) can be used to cure the radiation curable precursor resins of the present invention. Suitable sources of radiation include mercury vapor discharge lamps, carbon arcs, tungsten lamps, xenon lamps, lasers, sunlight, etc. The required amount of exposure to effect polymerization is dependent upon such factors as the identity and concentration of catalysts, the particular cyanate ester and other resins, the thickness of the exposed material, type of substrate, intensity of the radiation source and amount of heat associated with the radiation. In addition, thermal polymerization using direct heating or infrared electromagnetic radiation, as is known in the art, can be used to cure radiation curable resins of this invention. Preferred radiation sources for curing the resins of the present invention include heat and/or light energy. A preferred source of light energy is ultraviolet light.

Increasing curing temperature and increasing curing time both lead to more complete resin curing, with the temperature increase having the strongest effect. Using a filler in the COM-catalyzed cyanate ester does not negatively affect the curing kinetics.

Adhesion of the make resin to the substrate plays an important role in the grinding performance. Greater adhesion between the two usually correlates to improved shelling (i.e., fewer abrasive grains are released prematurely from the bond system, which is typically intended to hold the abrasive grain throughout the useful life of the abrasive grain) and wear resistance. This adhesion strength is measured via a 90° peel or "strip back" test. The properties of the cloth treatment resin can significantly contribute to the adhesion strength.

Adhesion to backings can be improved in the current invention by either using untreated substrate or using substrates treated with backing treatments of said invention. For example, in one embodiment, the make coat layer is applied to a porous substrate, such as an untreated cloth substrate. In this embodiment, the make coat layer not only functions as a make layer but also a presize, saturant, or subsize layer, sealing the pores of the cloth to the desired level without the need for a separate process step. In another embodiment, the cyanate containing backing treatment formulation was applied as a presize coating to the porous untreated cloth substrate before the make coat layer was applied. Good strip back test results were obtained for samples prepared accordingly.

One advantage of the present invention is greater thermal stability than known phenolic resin systems. For example, the inventive resins showed little degradation as measured by weight loss up to 440° C., while phenolic resin showed a gradual weight loss starting at 215° C.

Objects and advantages of this invention are further illustrated by the following examples, but the particular materials and amounts thereof recited in these examples, as well as other conditions and details, should not be construed to unduly limit this invention.

EXAMPLES

Percentages are based on weight unless noted otherwise, such as in test results reported as percent of control.

Test Methods

A. Swing Arm Grinding Test

Swing arm grinding test is mainly a shelling test, although the cut performance is also used to evaluate disc quality. The abrasive disc to be evaluated was attached to a 20.3 cm circular backup plate, available by ordering Part No 05114145192 from 3M Abrasive Systems Division, St. Paul, Minn. and secured to a Swing Arm tester, obtained from Reel Mfg. Inc., Centerville, Minn., with a metal screw fastener. A 1.897 mm thick 4130 steel cylindrical shaped work piece with a 30.5 cm diameter and 1.897 mm thickness was weighed and secured to the Swing Arm tester with a metal fastener. The load of the steel workpiece to be exerted onto the abrasive article disc was set at 4.0 kg. Next, the abrasive disc was rotated at 350 rpm and the workpiece was placed against the disc at an angle of 7 degrees. The endpoint of the test was 8 minutes at 350 rpm. The amount of steel removed (i.e., total cut) and weight loss of each abrasive disc (i.e., shelling) was recorded.

The cut of the work piece by the inventive article was compared to the cut by a control abrasive article, and the shelling conditions of the discs were determined after grinding by measuring the weight loss of the discs. The cut by the control abrasive with electrostatic-coated minerals was defined as 100%. The target for drop-coated minerals was 75% of the control to match the cut weight for drop-coated control materials as compared to electrostatic-coated control materials.

B. Elb Grinding Test

Grinding tests were run to evaluate the make and size coat capabilities using a reciprocating bed grinding machine obtained under the trade designation ELB Type SPA 2030ND from ELB Grinders Corp., Mountainside, N.J. Coated abrasives strips measuring 107 cm by 2.5 cm were attached using the attachment pieces at the end of the strips to the periphery of a 95.7 cm circumference metal wheel of the grinding machine, which was rotated to produce a surface speed of 1704 m/min. The workpieces were 1018 steel bars on which the surface to be abraded measured 1.27 cm by 35.6 cm. For each test a workpiece was mounted on a reciprocating table of the grinding machine with the longer axis of the workpiece parallel to the direction of the table motion. The table was traversed at a speed of 9.1 m/min in a direction parallel to the movement of the abrasive article at the grinding interface. At the end of each table traverse, the metal wheel was moved toward the table in a down feed increment of 0.051 to 0.089 mm. If one workpiece became worn down to a point where it was no longer in contact with the abrasive article, a new workpiece was mounted on the reciprocating table.

A new separate coated abrasive sample was used for each of the wet grinding tests and dry grinding tests. For the wet grinding tests, 23 L/min of water was delivered to the grinding interface as a coolant. For the dry grinding tests, 350–500 mL/min of water as a coolant was applied to the abraded surface of the work piece as it moved away from the grinding interface. When the table was traversed in the opposite direction, a stream of compressed air was used to remove any residual water from the surface of the work piece prior to it contacting the coated abrasive. The end point of the test was when the normal forces at the grinding interface reached 222.4 Newtons. The total amount of 1018 steel removed from the workpiece is reported in grams cut.

C. Schiefer Test Procedure

The coated abrasive article for each example was converted into a 10.2 cm diameter disc and secured to a foam back-up pad by means of a pressure sensitive adhesive. The coated abrasive disc and back-up pad assembly was installed on a Schiefer testing machine, and the coated abrasive disc was used to abrade a cellulose acetate butyrate polymer. The load was 4.5 kg. The endpoint of the test was 500 revolutions or cycles of the coated abrasive disc. The amount of cellulose acetate butyrate polymer removed was measured at the end of the test.

D. 90° Peel Adhesion Test Procedure

Coated abrasive articles were prepared using treated backings with various presizes and make coat compositions as indicated in the specific examples. The articles were subjected to 90° Peel Adhesion Tests at 25° C. to measure the degree of adhesion of the treated cloth backings to make coats.

Each coated abrasive article to be tested was converted into an about 8 cm wide by 25 cm long piece. One-half the length of a wooden board (17.8 cm by 7.6 cm by 0.6 cm thick) was coated with laminating adhesive (described below). The entire width of, but only the first 15 cm of the length of, the coated abrasive article was coated with laminating adhesive on the side bearing the abrasive particles. The side of the coated abrasive article bearing the abrasive particles was attached to the side of the board containing the laminating adhesive coating in such a manner that the 10 cm of the coated abrasive article not bearing the laminating adhesive overhung from the board. Pressure was applied such that the board and the coated abrasive article were intimately bonded. The board and coated abrasive article bonded with laminating adhesive were cured at room temperature (i.e., about 25° C.) for 4 hours and at 90° C. for 12 hours.

Next, the coated abrasive article to be tested was cut along a straight line on both sides of the article such that the width of the coated abrasive article was reduced to 5.1 cm. The resulting coated abrasive article/board composite was mounted horizontally in a fixture attached to the upper jaw of a tensile testing machine (SINTECH 6W from MTS Systems Corp., Eden Prairie, Minn.), and approximately 1 cm of the overhanging portion of the coated abrasive article was mounted into the lower jaw of the machine such that the distance between the jaws was 12.7 cm. The machine separated the jaws at a rate of 0.05 cm/second, with the coated abrasive article being pulled at an angle of 90° away from the wooden board so that a portion of the coated abrasive article separated from the board. Separation occurred between layers of the coated abrasive article. The force required for separation of the coated abrasive article from the board was charted by the machine and is expressed in kg/cm. The higher the force, the better the adhesion of the make coat to the presize coat and/or the presize coat to the backing.

Laminating Adhesive

A 237 mL jar was charged with 70 grams of epoxy (Epon 828, described below) and 40 grams of a polyamide amine (Versamid™ 125 from Henkel Adhesive Corp., Elgin, Ill.), and mixed with a low shear mixer.

Materials

Nylon Disc

A nylon disc (17.8 cm outer diameter 2.2 cm inner diameter and 0.76 mm thickness was prepared by extrusion molding Ultramid™ nylon obtained from BASF Corp., Mount Olive, N.Y.

Cloth A

A backing material of 100% polyester 4/1 sateens fabric made from open end spun yarns weighing about 326 grams per square meter commercially obtained from Milliken and Co., Spartanburg, S.C.

Treated Cloth

Cloth A, treated with a saturant of 90% resole phenolic/10% nitrile latex resin to bring the weight to 416 grams per square meter (g/m$^2$) and subsequently backsized with a blend of: 55% $CaCO_3$; 43% resole phenolic; and a small amount of $Fe_2O_3$ for color, to reach a final weight of about 516 g/m$^2$.

Film

A 3 mil (75 $\mu$m) thick microvoided polypropylene film, available from 3M Specialty Materials and Manufacturing Division, St. Paul, Minn.

PF1

A phenol-formaldehyde resin, having a phenol to formaldehyde mole ratio of 1.5–2 to 1, catalyzed with 1 to 5 weight percent (wt %) metal (Group I and II) hydroxide based on the total weight of the composition.

PF2

The composition PF1 filled with about 50 wt % $CaCO_3$, based on the total weight of the composition, was diluted with water to reach 83 wt % solids.

Cyanate Ester

Sold as PT15, PT30, PT60, and CT90 each available from Lonza Group Ltd., Basel, Switzerland.

1402

A polyester resin sold as Dynapol S1402 by Creanova, Inc.

TMPTA

Trimethylol propane triacrylate, commercially available from Sartomer Co., Exton, Pa.

EP

Epon™ 828 epoxy resin from Resolution Performance Products, Houston, Tex.

UF2

Urea-formaldehyde liquid resin, commercially available under the trade designation "Durite A1-3029 R" from Borden Chemical Inc., Louisville, Ky.

ACL

Aluminum chloride, commercially available from Aldrich Chemical, Milwaukee, Wis.

PTSOH

P-toluene sulfonic acid, commercially available from Aldrich Chemical.

$CaCO_3$

Calcium carbonate was obtained from J.M. Huber Corporation, Atlanta, Ga. under the trade designation Q325.

Feldspar

Feldspar was obtained under the trade designation MINSPAR 3 from K-T Feldspar Corporation, Spruce Pine, N.C.

Cryolite

Cryolite, also called RTN Cryolite, was obtained under the trade designation RTN CRYOLITE from TR International Trading Co., Houston, Tex.

NZX50

Grade 50 aluminum oxide/zirconium oxide particles commercially available as NORZON™ from Norton Co., Worcester, Mass.

P80

AO Grade P80 aluminum oxide particles, commercially available from Triebacher Schleifmittel AG, Villach, Austria.

Abrasive Disc Preparation

A make resin was prepared from a first radiation curable precursor including a high temperature thermoset cyanate ester resin, available from Lonza (Primaset PT series resins PT15, PT30, PT60, CT90) along with 1 wt % based on the total solids of a first curing agent which was an organometallic photocatalyst COM ((cyclopentadienyl)(m-xylene) iron(+1)hexafluoroantimonate(−1)), and filler as described in each particular example. The make resin was dissolved in a suitable solvent and then brush-coated onto a nylon disc.

Abrasive particles (NZX50) were drop coated or electrostatically coated onto the make resin. The mineral weight varied with resin compositions and was about 42 g per disc, unless otherwise noted.

The coated composite was heated to a temperature ramping from 100° C. to 160° C. over 3 hours to evaporate the solvents. The coated and dried composite was exposed to three passes under D-type ultraviolet light at 118 Watts/cm (available from Fusion) at 50 feet per minute (fpm) (15.1 m/min). Finally, the composite was heated overnight in an oven held at 160° C. to assure a completely cured composite and to further assure that the extent of cure was not a variable during the subsequent grinding tests.

A size resin formulation containing a second radiation curable precursor of a cyanate ester resin and 1 wt % of a second curing agent, also COM, along with 66 wt % filler was dissolved in an appropriate solvent and brush-coated over the cured composite. The size-coated composite was then exposed to the same drying, curing, and heating cycles as the make-coated composite.

Although solvent coating was used for convenience, several solventless methods are also useful (e.g., melt coating, powder coating, melt spraying).

Control discs were made with the procedure described above except that a phenolic resin (PF1) was used for both the make and size resins. The make resin was filled with 46 wt % of $CaCO_3$ filler and size resin was filled with 66 wt % Cryolite. The NZX50 minerals were electrostatically coated. Coating weight of the resins was set to be comparable to that of the experimental discs. The target dry make coating weight was 2 g per disc, while the dry size weight was typically around 7.5 g per disc. The mineral weight was targeted at 42 g per disc.

Abrasive Belt Preparation

The make resin was made as described above in the general procedure using a ratio (by weight) of 5:4:1 and 7:2:1 of cyanate ester (PT15):epoxy (EP):polyester (1402) as the first radiation curable precursor, 1 wt % of COM as the first curing agent, and 46 wt % $CaCO_3$ filler.

The size resin was made as described above in the general procedure using a cyanate ester (PT60) as the second radiation curable precursor, 1 wt % of COM as the second curing agent, and 66 wt % of either Cryolite or $CaCO_3$ filler.

The substrate was Treated Cloth, unless otherwise noted in the specific example. The coating processes are discussed in specific examples. NZX50 minerals were always electrostatic coated.

The control belts were constructed with phenolic make and size resins (PF1) using the same coating methods as the belts with which the particular control is compared. The curing schedule of the size resin remained the same as that in the abrasive disc preparation method (above), except that the make resin was hot-melt coated so the temperature ramping step was omitted.

Because the grinding performance could be significantly affected by the coating weight, the coating weight combination was screened before conducting comparisons. The coating weight of the control strips was used as the standard (100%). A plot of cut performance vs. size coating weight led to desirable combinations of the make and size coating weight. A relatively light make weight of 1.8 g per 2×8 inch (5×20 cm) strip together with a heavier size weight (120% of control) yielded the best grinding results. This combination was used as the target coating weights for the Elb strip constructions.

Examples 1–3 and Comparative Example A

The make resin was made as described in the general procedure using varied ratios of a cyanate ester resin (PT15) and a polyester resin (1402), which were dissolved in trichloroethane and blended with 66 wt % Cryolite filler and the nylon disc substrate. The polyester resin level was selected between about 5 and 15 wt % to maintain proper tack to both the nylon substrate and the minerals.

The size resin was made as described in the general procedure using a cyanate ester resin (PT60) dissolved in trichloroethane and blended with 66 wt % Cryolite filler. Test results shown in the table below, wherein the desired performance was a minimum of 75% of the control.

TABLE 1

Cyanate Ester - Polyester Resin Mixtures

| Example | Make Resin (wt ratio) | Cut (% of Control) | Shelling (g) |
|---|---|---|---|
| 1 | 95:5 PT15/1402 | 76 | 0.5 |
| 2 | 90:10 PT15/1402 | 82 | 1.0 |
| 3 | 85:15 PT15/1402 | 62 | 2.0 |
| CE-A | Control (phenolic) | 100 | 1.0 |

These examples showed that improvements in shelling were achieved with acceptable results in the cut test.

Examples 4–7 and Comparative Example B

The make resin was made as described in the general procedure using varied ratios of a cyanate ester resin (PT15)

and EP (Epon 828) which were dissolved in MIBK and then blended with 66 wt % Cryolite filler and coated onto a nylon disc substrate. The size resin was prepared as in Examples 1–3.

TABLE 2

Cyanate Ester - Epoxy Resin Combinations

| Example | Make Resin (wt ratio) | Cut (% of Control) | Shelling (g) |
|---|---|---|---|
| 4 | 90:10 PT15/EP | 82 | 1.1 |
| 5 | 80:20 PT15/EP | 84 | 1.2 |
| 6 | 70:30 PT15/EP | 85 | 1.2 |
| 7 | 60:40 PT15/EP | 77 | 1.4 |
| CE-B | Control | 100 | 1.0 |

These examples showed that a significant amount of relatively inexpensive epoxy can be added to the make resin without sacrificing performance.

Examples 8–11 and Comparative Example C

These examples were made as described above except that varied weight ratios of cyanate ester resin (PT15)/EP (Epon 828)/polyester (1402) were compounded in trichloroethane before coating. The size resin was prepared as in Examples 1–3.

TABLE 3

Cyanate - Epoxy - Polyester Resin Combinations

| Example | Make Resin (wt ratio) | Cut (% of Control) | Shelling (g) |
|---|---|---|---|
| 8 | 70:20:10 | 85 | 1.1 |
| 9 | 70:10:20 | 84 | 1.2 |
| 10 | 50:30:20 | 77 | 0.9 |
| 11 | 50:40:10 | 87 | 0.9 |
| CE-C | Control | 100 | 1.0 |

These results show that three-component combinations also provided good performance.

Examples 12–15 and Comparative Example D

A make resin was compounded with 70 wt % cyanate ester resin (PT15) and 30 wt % EP dissolved in MIBK, then blended with 46 wt % of the selected filler and then coated onto a nylon disc substrate. The size resin was prepared as in Examples 1–3.

TABLE 4

Filler Effects

| Example | Filler Type in Make Resin | Cut (% of Control) | Shelling (g) |
|---|---|---|---|
| 12 | None | 85 | 1.2 |
| 13 | CaCO$_3$ | 90 | 0.8 |
| 14 | Cryolite | 85 | 0.9 |
| 15 | Feldspar | 83 | 1.0 |
| CE-D | CaCO$_3$ | 100 | 1.2 |

The study showed that CaCO$_3$ improved shelling most significantly without affecting the cutting performance.

Examples 16–19 and Comparative Example E

Discs were made as described in the general procedure above using phenolic make resin (PF1) and electrostatic-coated minerals.

The size resin was made as described in the general procedure above except that various cyanate esters were used. In addition to material performance, the physical state of the resins before curing was also considered in resin selection. The PT60 and CT90 cyanate ester resins were glassy materials at room temperature, which showed that powder coating methods could be used to apply size resin without volatile organic compounds. In addition, PT15 cyanate ester resin is an amorphous material that can be hot-melt coated.

TABLE 5

Various Cyanate Size Resins

| Example | Size Resin | Cut (% of Control) | Shelling (g) |
|---|---|---|---|
| 16 | PT15 | 88 | 1.4 |
| 17 | PT30 | 97 | 1.4 |
| 18 | PT60 | 94 | 1.0 |
| 19 | CT90 | 80 | 2.3 |
| CE-E | Control | 100 | 1.2 |

This study showed that performance equivalent to the control was achieved with various cyanate ester size resins along with phenolic make resin.

Examples 20–24

Discs were made as described in the general procedure above using cyanate make resin (5:4:1, described above) and drop-coated minerals.

The size resin was made as described in the general procedure above except that the cyanate ester (PT15 or PT60) was blended with EP and dissolved in MIBK before blending in 66 wt % Cryolite filler. The amount of epoxy is reported as the weight percent epoxy in the size resin, with the balance of the size resin being the cyanate ester. Cut is reported as percent of control. Shelling is reported in grams.

TABLE 6

Cyanate- Epoxy Size Resins

| | | PT60 | | PT15 | |
|---|---|---|---|---|---|
| Example | Epoxy (%) | Cut | Shelling | Cut | Shelling |
| 20 | 0 | 78 | 1.3 | 65 | 1.7 |
| 21 | 10 | 75 | 1.1 | 63 | 0.9 |
| 22 | 20 | 70 | 1.3 | 64 | 0.8 |
| 23 | 30 | 69 | 2.8 | 66 | 0.9 |
| 24 | 40 | 63 | 2.0 | 66 | 1.3 |

These examples showed that performance comparable to or even better than cyanate ester alone were achieved using blends of cyanate ester with epoxy.

Examples 25–27 and Comparative Example F

Discs were made as described in the general procedure above using phenolic make resin and drop-coated minerals.

The size resin made as described in the general procedure above except that the cyanate ester (PT60) was dissolved in MIBK before blending in the selected filler.

TABLE 7

Filler Effects in Size Resin.

| Example | Fillers in Size (66 wt %) | Cut (% of Control) | Shelling (g) |
|---|---|---|---|
| 25 | Cryolite | 98 | 1.5 |
| 26 | CaCO$_3$ | 96 | 1.2 |
| 27 | Feldspar | 72 | 2.0 |
| CE-F | Control | 100 | 1.2 |

TABLE 8

Wet Grinding Results

| Example | Cut (g) | % Control |
|---|---|---|
| 28 | 1557 | 122 |
| 29 | 1344 | 106 |
| 30 | 1865 | 147 |
| CE-G | 1272 | 100 |

TABLE 9

Dry Grinding Results

| Example | Cut (g) | % Control |
|---|---|---|
| 31 | 1938 | 102 |
| 32 | 1940 | 102 |
| CE-H | 1895 | 100 |

Examples 28–32 and Comparative Examples G and H

The make and size resins were compounded as described above in the Abrasive Belt Preparation section. A melt-compounded make resin was pre-heated to 90° C. and then coated on the backing using a knife coater at 60° C. Then the minerals were electrostatically coated. The make resin coating weight was 2.1 g per 2×8 inch strip (5×20 cm) and mineral weight was 5.8 g on the same strip.

Size resin containing cyanate ester resin (PT60) dissolved in MIBK, blended with 66 wt % Cryolite filler, and then brush-coated onto the make- and mineral-coated substrate at a target size weight of 31.2 g of the resin mixture (70 wt % solids) on a 4 inch×42 inch (10 cm×107 cm) strip.

In Examples 29–31, cyanate-blend make resin (5:4:1) and cyanate size resins were used. In Example 29, the substrate was Treated Cloth, held overnight at 160° C., the make resin coating weight was 80% of the control, and the size resin coating weight was 100% of the control. Example 30 was prepared in the same manner as Example 29 except Cloth A backing was used (also held overnight at 160° C.) and the make resin coating weight was 100% of the control. Example 31, was prepared in the same manner as Example 29 except that the make resin and the size resin were subjected to 2 hours of post-curing at 180° C. after being held overnight at 160° C.

In Example 32, a cyanate-blend make resin (7:2:1) and cyanate size resins were used on a Treated Cloth. Example 33 was prepared in the same manner except a phenolic make resin (PF1) was used. The samples were held overnight at 160° C. The make resin coating weight was 80% of the control for Example 32 and 100% of the control for Example 33. The size resin coating weight was 100% of the control for both.

When Cloth A backing was used, the make resins also functioned as the presize backing treatments. This example showed that the backing treatment and the make coating can be combined into a single-step process.

The wet and dry grinding results are tabulated below. The wet grinding results matched or exceeded the control for both the treated and untreated backings used. Post cure of the resins seemed to have markedly improved the abrasive performance to almost 50% higher than the control. Benchmark performance expectations, set using control phenolic strips (phenolic make and size resins), were also met in the dry grinding test.

Example 33

A continuous process of hot-melt coating, UV-curing, and electrostatic-coated abrasive particles was used to prepare the make resin and mineral coating input to this example. The input make resin coating weight ranged from 1.7 to 2.1 g per 2×8 inch (5×20 cm) strip.

A PT60 size resin was prepared to have a viscosity in the range of 300–600 cP. The filler (Cryolite) level was set to 52 wt % and the total solids in MIBK was set at 76 wt %. The grinding results were in the range of 80% of control.

Example 34

A sponge-type paint roller was used to coat a 76 wt % solids PT60 size resin (in MIBK solvent, 66 wt % Cryolite filler). The grinding performance was improved, especially in the case of cyanate size resin on phenolic make (PF1), the dry grinding performance was comparable (95%) to control strips made by the roll coating method.

Example 35

A make resin was prepared as described in the Abrasive Belt Preparation section except that 1 to 6 wt % of TMPTA was included in the make resin to enhance the resin viscosity after UV irradiation to improve the mineral orientation.

Markedly improved mineral orientation, as compared to make resin materials not having TMPTA, was observed by optical microscopy.

Example 36 and Comparative Examples J and K

This comparison showed the improvement of the invention over a material that was described in WO 99/56914.

Example 36 used a make resin of PT15/EP/TMPTA in a weight ratio of (70:30:2.5), and a size resin of PT60 cyanate ester with 52 wt % CaCO$_3$ filler.

In CE J and K, Film was coated with a make resin of UF2/Resole phenolic/ACL/PTSOH in a weight ratio of (85:15:12:1). CE J used a size resin of PF1 with 35 wt % feldspar filler. CE K used a size resin of PT60 with 50 wt % CaCO$_3$ filler.

The abrasive layer of each sample was electrostatically coated with P80 mineral. The Schiefer test used a 20 lb. (9.07 kg) load for 500 cycles. The amount of material cut was reported in grams.

TABLE 10

Results

| Example | Size coating method | Cut (g) |
|---|---|---|
| 36 | Solvent brush coating | 4.20 |
| CE-J | Roll coating | 3.75 |
| CE-K | Powder coating | 3.63 |

The Schiefer test results show that the material and method of Example 36 had comparable or better results than the comparative materials. However, this test is not aggressive enough to differentiate the resin performance under more typical coarse grinding application conditions. That is, resins can survive the Schiefer test but still not endure the much more aggressive coarse grinding test, such as the Elb test and especially the wet Elb test used above.

Examples 37–39 and Comparative Example L

Backing Treament Examples

The substrate for Example 37 and CE-L was Treated Cloth. A 3-mil (0.076 mm) layer of a cyanate blend (70 wt % PT15 to 30 wt % EP) was used as a presize to treat Cloth A substrate for Examples 38 and 39.

A 30.5 cm wide coating knife and platform were heated to 66° C. The knife was set to a 25 μm gap. The treated cloth was coated with make coat composition using the knife and platform. The cloth was mechanically pulled under the knife to form the make coat by hand.

A make resin of PT15/EP/TMPTA in a weight ratio of 70:30:2.5 was mixed with 52 wt % (based on total resin weight) CaCO$_3$ filler for Examples 37 and 39. This make coat composition was irradiated to at least partially react the polyfunctional (meth)acrylate with a UV Fusion lamp at 118 Watts/cm (D-bulb) at about 5 meters per minute (mpm), followed by electrostatic coating of abrasive grit into the make coat composition. A phenolic make resin of PF1 with 52 wt % CaCO$_3$ filler was used for Example 38 and CE-L.

The make coat step was followed by electrostatic-coating abrasive grit (NZX50), followed by a PF2 size resin.

The 90° Peel Adhesion Test was used to determine the quality of the backing treatment. Higher values indicated better cloth treatment. The following table shows the construction of the test specimen and the results.

TABLE 11

Cloth Substrate Results

| Ex. | Presize | Make Resin | 90° Peel (lb./inch) | (g/cm) |
|---|---|---|---|---|
| 37 | Phenolic/latex | PT15/EP/TMPTA | 21.5 | 3840 |
| 38 | PT15/EP | Phenolic | 37.7 | 6733 |
| 39 | PT15/EP | PT15/EP/TMPTA | 33.0 | 5893 |
| CE-L | Phenolic/latex | Phenolic | 35.2 | 6286 |

These examples showed that the cyanate-epoxy presize layer provided adequate adhesion to both the cloth substrate and traditional phenolic or cyanate-epoxy make resins.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually incorporated by reference.

What is claimed is:

1. A treated substrate for an abrasive article comprising:
    a porous cloth backing material coated with a resin derived from a curable precursor resin, which comprises an energy-curable component comprising a cyanate ester resin and a curing agent, wherein the resin seals the pores of the cloth material.

2. The treated substrate of claim 1, wherein the curable precursor resin further comprises a material selected from an epoxy resin, a polyester resin, an acrylate resin with a photoinitiator, and combinations thereof.

3. The treated substrate of claim 2, wherein the curable precursor resin comprises from about 50 to over 99 wt % cyanate ester resin and from about 0 to about 50 wt % epoxy resin.

4. An abrasive article comprising:
    a presize, saturant, subsize, and/or backsize treated substrate according to claim 1 and further comprising a plurality of abrasive particles incorporated into a bond system.

5. An abrasive article comprising:
    a plurality of abrasive particles incorporated into a bond system,
    wherein the bond system comprises a make resin derived from a first curable precursor resin, which comprises a first radiation curable component comprising a cyanate ester resin, about 0.10 to about 6 wt % of an acrylate resin, and a first curing agent, and
    wherein the bond system additionally comprises a size resin derived from a second curable precursor resin, which comprises a second radiation curable component comprising a cyanate ester resin and a second curing agent.

6. The abrasive article of claim 5, wherein the first curable precursor resin further comprises a material selected from an epoxy resin, a polyester resin with a photoinitiator, and combinations thereof.

7. The abrasive article of claim 5, wherein the acrylate resin is a polyfunctional acrylate.

8. The abrasive article of claim 6, wherein the epoxy resin is an aliphatic or aromatic epoxy resin.

9. The abrasive article of claim 6, wherein the first curable precursor resin comprises from about 50 to over 99 weight percent (wt %) cyanate ester resin and from about 0 to about 50 wt % epoxy resin.

10. The abrasive article of claim 6, wherein the first curable precursor resin comprises from about 2.5 to about 30 wt % polyester resin and from about 0 to about 50 wt % epoxy resin.

11. The abrasive article of claim 5, wherein the second curable precursor resin further comprises from about 50 to over 99 weight percent (wt %) cyanate ester resin and from about 0 to about 50 wt % of an epoxy resin.

12. The abrasive article of claim 5, wherein the cyanate ester resin in the first and/or second radiation curable components is an aromatic cyanate ester resin.

13. The abrasive article of claim 12, wherein the cyanate ester resin in the first and/or second radiation curable components is an aromatic cyanate ester resin of the formula:

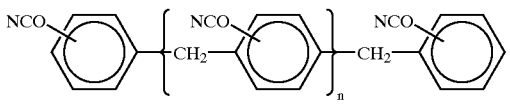

wherein n is selected to provide the resin a modulus ranging from soft to brittle, and wherein n may be the same or different between the first and second radiation curable components, and wherein resins of more than one n may be in either one or both components.

14. The abrasive article of claim 5 wherein at least one of the first curing agent and the second curing agent comprises a catalyst selected from a photo catalyst, a thermal catalyst, and mixtures thereof.

15. The abrasive article of claim 5 wherein the first curable precursor resin is capable of being coated without solvent.

16. The abrasive article of claim 5 wherein the second curable precursor resin is capable of being coated without solvent.

17. A method of making an abrasive article comprising:
providing a substrate;
applying to the substrate a make coat layer comprising a first energy-curable make coat precursor resin comprising a cyanate ester resin, about 0.10 to about 6 wt % of an acrylate resin, and a first curing agent;
applying a multiplicity of abrasive particles to the make coat layer;
curing the make coat precursor resin;
applying over the abrasive particles a size coat layer comprising a second energy-curable size coat precursor resin comprising a cyanate ester resin and a second curing agent; and
curing the size coat precursor resin.

18. The method of claim 17 wherein the step of applying the make coat layer involves a process selected from melt-processing, knife coating, spray coating, powder coating, and roll coating.

19. The method of claim 17 wherein the step of applying the size coat layer involves a process selected from spray coating, powder coating, and roll coating.

20. The method of claim 17 wherein at least one curing step is effected by application of heat or light energy.

21. The method of claim 17 wherein at least one curing step is effected by application of ultraviolet light.

22. The method of claim 17 wherein the make coat precursor resin contains essentially no solvent during the step of applying the make coat layer.

23. The method of claim 17 wherein the size coat precursor resin contains essentially no solvent during the step of and applying the size coat layer.

24. The method of claim 17 wherein the substrate is selected from untreated cloth and treated cloth.

25. A method of making an abrasive article comprising:
providing a substrate;
applying to the substrate a make coat layer comprising a first energy-curable make coat precursor resin comprising a cyanate ester resin, about 0.10 to about 6 wt % of an acrylate resin, and a first curing agent, wherein the substrate is a cloth treated with a resin having the same composition as the make coat layer;
applying a multiplicity of abrasive particles to the make coat layer;
curing the make coat precursor resin;
applying over the abrasive particles a size coat layer comprising a second energy-curable size coat precursor resin comprising a cyanate ester resin and a second curing agent; and
curing the size coat precursor resin.

26. The method of claim 17 wherein the step of applying the make coat layer is performed on an untreated cloth substrate such that the make coat layer functions as a pre-size layer.

27. The abrasive article of claim 5, further comprising a substrate selected from untreated cloth and treated cloth.

28. A treated substrate for an abrasive article comprising:
a backing material coated with a resin derived from a curable precursor resin, which comprises an energy-curable component comprising a cyanate ester resin, about 0.1 to about 6 wt % of an acrylate resin, and a curing agent.

29. An abrasive article comprising:
a porous cloth back material coated with a resin derived from a curable precursor resin, which comprises an energy-curable component comprising a cyanate ester resin and a curing agent, wherein the precursor resin seals the pores of the cloth material;
a plurality of abrasive particles incorporated into a bond system;
wherein the bond system comprises a make resin derived from a first curable precursor resin, which comprises a first radiation curable component comprising a cyanate ester resin, about 0.10 to less than about 10 wt % of an acrylate resin, and a first curing agent; and
wherein the bond system additionally comprises a size resin derived from a second curable precursor resin, which comprises a second radiation curable component comprising a cyanate ester resin and a second curing agent.

30. The treated substrate of claim 28, further comprising an epoxy resin.

31. An abrasive article comprising:
a backing material coated with a resin derived from a curable precursor resin, which comprises an energy-curable component comprising a cyanate ester resin, about 0.1 to about 6 wt % of an acrylate resin, and a curing agent;
a plurality of abrasive particles incorporated into a bond system;
wherein the bond system comprises a make resin derived from a first curable precursor resin, which comprises a first radiation curable component comprising a cyanate ester resin, about 0.10 to less than about 10 wt % of an acrylate resin, and a first curing agent; and
wherein the bond system additionally comprises a size resin derived from a second curable precursor resin, which comprises a second radiation curable component comprising a cyanate ester resin and a second curing agent.

\* \* \* \* \*

UNITED STATES PATENT AND TRADEMARK OFFICE
CERTIFICATE OF CORRECTION

PATENT NO. : 6,709,738 B2
DATED : March 23, 2004
INVENTOR(S) : Ma, Jingwen

It is certified that error appears in the above-identified patent and that said Letters Patent is hereby corrected as shown below:

Column 7,
Line 37, delete "cyclohexane", insert in place thereof -- cyclohexene --;

Column 8,
Line 48, delete "cyxlohexane", insert in place thereof -- cyclohexane --;

Column 26,
Line 24, delete "back", insert in place thereof -- backing --.

Signed and Sealed this

Twenty-sixth Day of October, 2004

JON W. DUDAS
*Director of the United States Patent and Trademark Office*